Nov. 1, 1955

R. MERBLER 2,722,429

BEARING MOUNTING FOR ROLLER SKATE TRUCKS

Filed March 27, 1953

INVENTOR.
Rudolph Merbler
BY
McMorrow, Berman & Davidson
ATTORNEYS

United States Patent Office 2,722,429
Patented Nov. 1, 1955

2,722,429
BEARING MOUNTING FOR ROLLER SKATE TRUCKS

Rudolph Merbler, Schenectady, N. Y.

Application March 27, 1953, Serial No. 345,186

1 Claim. (Cl. 280—11.28)

Conventionally, the bearings of precision roller skates are bolted to the trucks in such a manner as to hold the bearings fast to the trucks. In one conventional method, precision bearings are placed over an axle and bolted tightly against the truck by means of a threaded nut. In another method, the bearings are bolted against the truck, but a spacer is placed between the bearings, the nut then being turned home tightly against the bearing.

An inherent fault in this type of mounting is found in the assembly of the truck, precision bearing, spider washer, threaded nut, and axle into what is, in effect, a solid unit. The only freedom of movement is between the ball bearing elements and the inner and outer bearing races. As a result, the vibration and other forces acting on the wheels of the skate tend to deflect the bearings from the bearing races. This distortion of the bearing assembly slows up the rate of speed with which the wheels turn, and imposes excessive strain and effort upon the skater. Particularly when the skates are being used in competitive dance skating, figure skating, and other types of precision skating such distortion is obviously undesirable.

An important object of the present invention, accordingly, is to provide a bearing mounting for roller skate trucks wherein a helical compression spring will be circumposed about the axle, between the precision bearing and the truck, which spring will exert a continuous, yielding pressure against the precision bearing tending to hold the same firmly against the conventional threaded nut. Despite the fact that the bearing is normally held with sufficient firmness against the nut, the bearing will be cushioned by the spring against shocks and vibration, the spring yielding as necessary to absorb said shocks.

Another important object is to provide, in a mounting as described, a construction, deriving from the use of said helical spring, which will assist in reducing internal stresses in the precision bearings, thus to permit the bearings to turn freely in their races. It is proposed, by this means, to permit the skater to skate effortlessly, and it is further proposed, at the same time, to increase substantially the life of precision bearings of the type used.

Another important object is to provide a bearing mounting as described which, though possessing the decided advantages noted above, will not weaken the axle and truck structure.

Yet another object is to provide a small but distinct clearance between the inner bearing race and the axle, to permit the wheel to pivot slightly out of its normal plane when lateral stress is placed thereupon during turns, etc., thus to give the wheel sufficient freedom and flexibility. In this way, it is proposed to permit the whole width of the roller to bear upon the skating surface, thereby resulting, in turn, in better traction without causing the bearing elements to pivot where they roll within the bearing races. Said clearance further permits the wheel to move vertically to a slight extent, to further reduce the impact of dirt, grit, and the like upon the wheel bearings.

Other objects will appear from the following description, the claim appended thereto, and from the annexed drawing, in which like reference characters designate like parts throughout the several views, and wherein:

Figure 1:
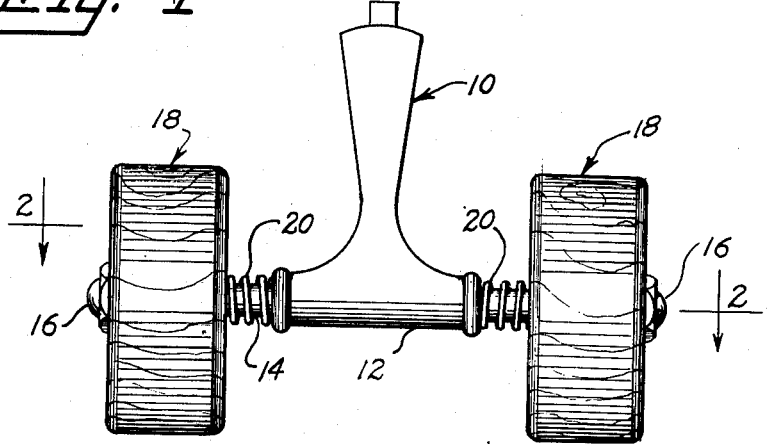
Figure 1 is an elevational view of a precision roller skate truck and the wheels carried thereby, equipped with a bearing mounting formed in accordance with the present invention.
Figure 2:
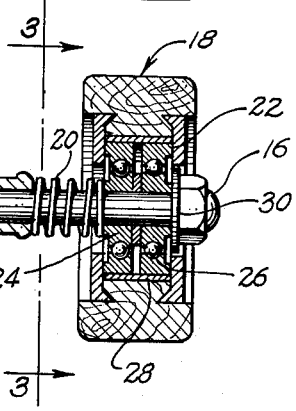
Figure 2 is a sectional view taken substantially on line 2—2 of Figure 1.
Figure 3:
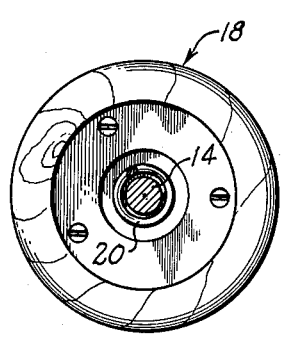
Figure 3 is a transverse sectional view taken on line 3—3 of Figure 2.

The skate truck 10 is generally conventional, except for the fact that the axle housing 12 thereof is slightly shorter than the housing of a truck such as that used widely on precision roller skates of modern design. An axle 14 is mounted in, and has its opposite ends projecting beyond the ends of the housing 12, and is threaded at its opposite ends to receive nuts 16.

The wheels have been designated generally at 18, and interposed between said wheels and the adjacent ends of housing 12 are helical compression springs 20. These are continuously held under compression between the truck 10 and the respective wheels, and exert a continuous, yielding pressure against the wheels tending to force the wheels in the direction of the nuts 16.

The bearing assembly of each wheel has been designated generally by the reference numeral 22, and no claim is herein made to said bearing assembly per se. Any of various precision bearing assemblies already known can be used in combination with the remaining parts of the invention.

A bearing assembly of the type shown includes an inner race 24, anti-friction elements 26 here shown as being of the ball type, and an outer race 28. The springs 20 bear directly against, and exert a continuous yielding pressure upon, the inner races 24, tending to shift said inner races axially of axle 14, toward nuts 16. A washer could, if desired, be interposed between the springs and inner bearing races. Similarly, a washer 30 could be interposed, and would normally be used, between each inner race 24 and its associated nut 16.

It is important to note, in this connection, that there is a slight but very distinct clearance between the surface of axle 14, and the inner surface of each inner bearing race 24. This clearance permits the entire bearing assembly 22, and the wheel portions carried thereby, to pivot as one out of their normal plane perpendicular to the axis of axle 14. This pivotal movement of the wheel is, of course, very slight, but is sufficient to assist in the absorption of vibrations and shocks, and is further adapted to maintain the floor-contacting surfaces of the wheel in full contact with the floor through the whole width of the rollers, thus to increase traction.

Heretofore, it should be noted, the fixedly mounted bearing assembly normally used has not been able to absorb shocks and maintain traction in this manner, because the wheel is held in a plane normal to the longitudinal center line of axle 14 at all times, thus causing the entire truck to be laterally tilted out of full engagement with the floor surface.

Further, in conventional mountings, strains of the type referred to have been transmitted to the bearing elements 26, causing distortion of the bearing assembly and deflection of said elements out of their associated races. Not only has this increased vibration, but also, this characteristic has substantially shortened the life of the bearings.

In use of the skate, the springs 20 will exert a strong, but nevertheless yielding, pressure against the inner bearing races 24, so as to hold said bearing races firmly against the nuts 16. When, however, shocks and other vibration-producing forces act upon the wheels, the springs will yield slightly, so as to cushion the bearings from shocks of the type referred to. A decidedly advantageous shock-absorbing characteristic is thus imparted to the bearing mounting, the bearing assembly shifting axially of the axle 14 in the direction of truck 10, as necessary for the purpose of relieving vibratory strains and stresses. The springs, it is worthy to note, act, depending upon the nature of the shock imposed on the skate, in combination with the clearance between the inner bearing races and the axle in absorbing shock and vibration. In other instances, the springs may act alone, and in still other instances, the clearance between the inner bearing races and axle will be sufficient, in eliminating vibration.

The net result is to provide a bearing mounting for skates which will reduce measurably the effort required upon the part of the skater, thereby promoting, in turn, more graceful skating.

At the same time, the construction increases considerably the life of the precision bearings used, since the bearings are relieved of strains which they have heretofore had to assume.

Still further, it is an important characteristic of the invention that the bearing mounting illustrated and described is such as to permit the incorporation of the same in conventional skates already in use. Conventional precision bearings can be employed, and conventional rollers can also be employed. Still further, the axle and truck are conventional, it being necessary that only the length of the axle housing of the truck be shortened to a slight extent.

A further advantage is believed to reside in the fact that the nuts 16, when used in association with springs 20, can be employed as take-up nuts, said nuts being threaded inwardly as necessary, or for that matter outwardly, to adjust the tension of the springs.

Another important function of the helical compression spring is to apply a firm pressure against the inner bearing race 24, to prevent it from rotating continuously about axle 14. Continuous rotation of the inner bearing race about the axle would be undesirable, since the advantages deriving from the use of precision bearings would be eliminated, the axle would wear, and the inner bearing race would also be subject to substantial wear.

In this connection, I may, in a commercial embodiment of the invention, utilize a circumferential series of small notches at opposite ends of the axle housing 12, and a circumferential series of similar notches on that face of the inner bearing race that confronts the end of the axle housing. The ends of the helical compression spring would then be so bent as to engage the notches of the axle housing and inner bearing race, thus to prevent the inner race from rotating.

Although I may, as noted above, utilize a construction such as has been described in the preceding paragraph, I do not feel that it is absolutely necessary that such arrangement be employed. The pressure of the spring against the inner race should, I believe, be sufficient to hold the spring from rotating continuously.

Another advantage of the invention resides in the fact that if a bearing should bind, as precision bearings sometimes do when grit or dirt enters the same (as in the case, for instance, of worn dust retainers in old, worn bearings), the inner race will turn intermittently to reduce the sudden drag on the wheel as it binds. Such a situation is not uncommon. Utilizing a construction like that illustrated and described herein, the skater could still continue until such time as he is able to replace or repair the faulty bearing.

Further, I believe it is important to mention that the nut 16, at each end of the axle, should have a snug or medium-tight fit, or should be of the elastic stop nut type, so that it will not turn off while skating.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a bearing mounting for a roller skate truck the combination, with a truck, an axle carried thereby, and with a bearing carried by said axle and including a cylindrical, sleeve-like inner bearing race circumposed about the axle in coaxial alignment therewith, an annular outer bearing race concentric with the inner race and circumposed thereabout, and anti-friction ball elements arranged in a circular series between said races, of a helical spring circumposed about the axle and held under compression between the truck and inner race, said spring being of a diameter smaller than that of the circular series of ball elements and being engaged directly with the inner bearing race, said circular series of ball elements and said outer race being wholly out of engagement with the spring so as to be free of pressure exerted by the spring, said spring exerting a continuous yielding pressure tending to bodily shift the inner race axially of the axle in a direction away from the truck; and a nut threaded upon the axle and bearing directly against the inner bearing race to limit movement thereof in a direction away from the truck, said pressure of the spring against the inner bearing race being of a value to releasably hold the inner bearing race against rotation relative to the axle.

References Cited in the file of this patent

UNITED STATES PATENTS

| | | |
|---|---|---|
| 2,039,153 | Edwards | Apr. 28, 1936 |
| 2,304,944 | Martinec | Dec. 15, 1942 |
| 2,467,437 | Martinec | Apr. 19, 1949 |
| 2,622,931 | Petrelli et al. | Dec. 23, 1952 |

FOREIGN PATENTS

| | | |
|---|---|---|
| 4,783 of 1876 | Great Britain | Feb. 6, 1877 |
| 453,425 | Great Britain | Sept. 11, 1936 |